United States Patent Office 3,152,478
Patented Oct. 13, 1964

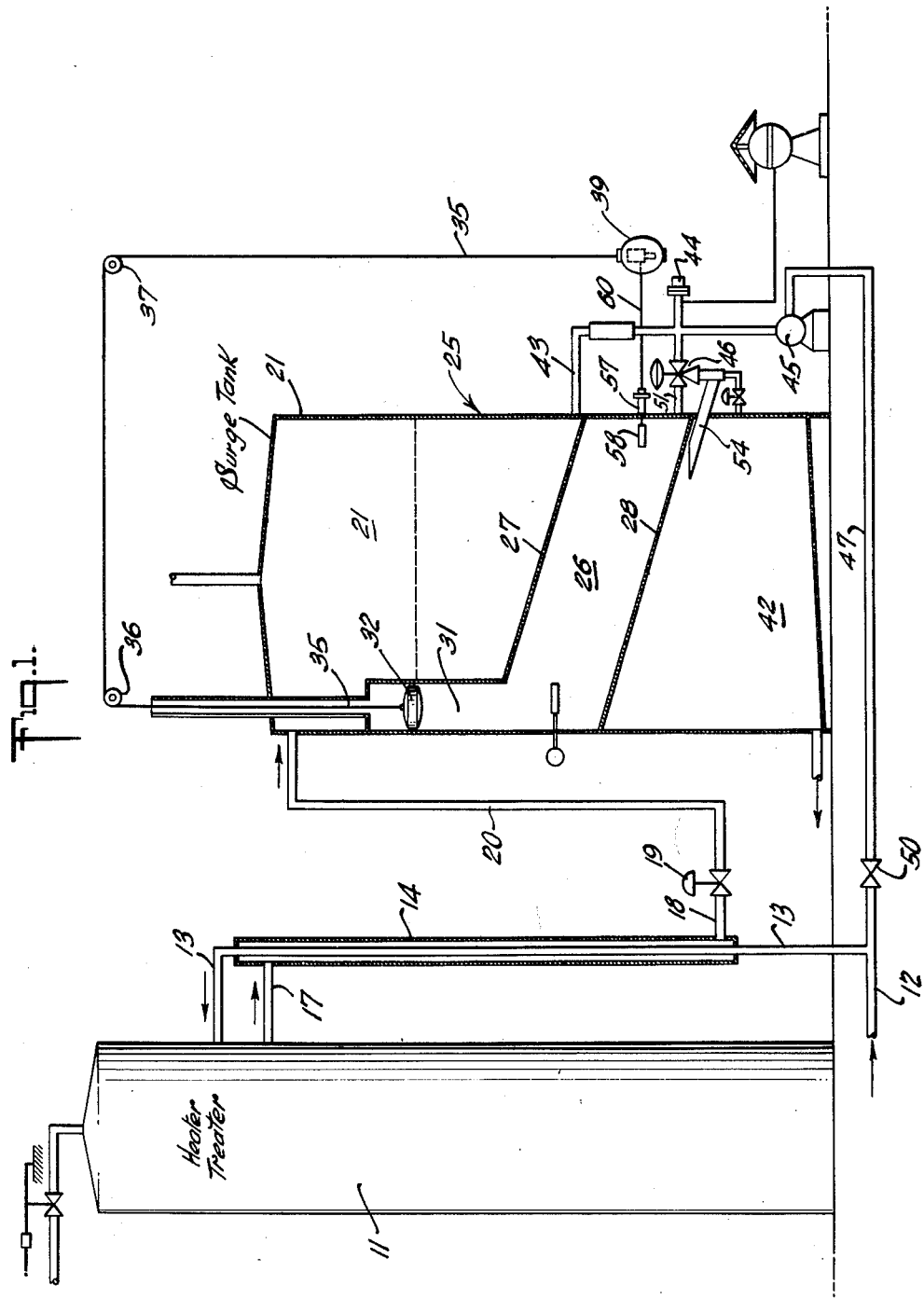

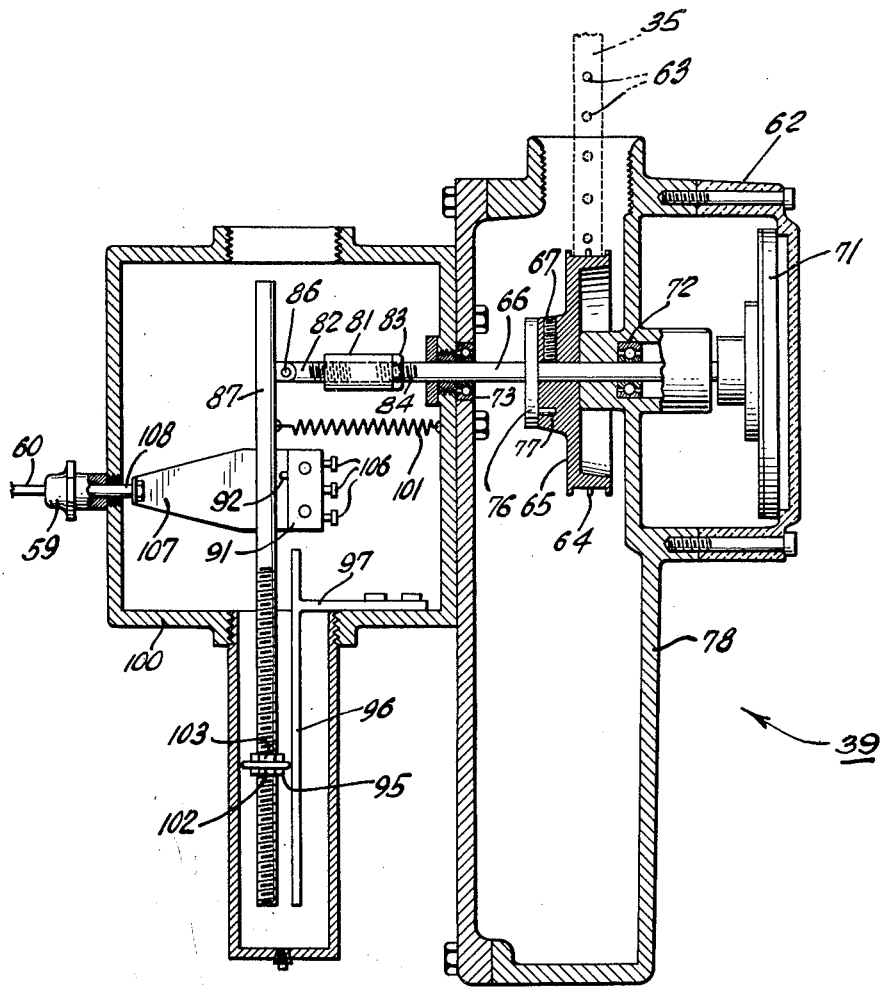

3,152,478
TEMPERATURE COMPENSATED FLUID
QUANTITY MEASURING SYSTEM
Leonard H. Hughes, Dallas, and Laurence M. Hubby,
Bellaire, Tex., assignors to Texaco Inc., New York,
N.Y., a corporation of Delaware
Filed Apr. 13, 1962, Ser. No. 187,270
6 Claims. (Cl. 73—308)

This invention concerns a fluid quantity measuring system generally. More specifically, it relates to improvements in connection with a fluid quantity measuring system that is especially adapted for use with a so-called lease automatic custody transfer (LACT) system. The invention relates particularly to an improved temperature compensating arrangement that is adapted to be employed with a fluid quantity measuring system wherein the system is one which employs a measuring tank having a predetermined volume, and in addition makes use of such a tank that has a reduced cross-section area portion adapted for improving the accuracy of the measurements taken.

While it is known to employ a batch type quantity measuring arrangement, for fluid quantity measurements, and in connection with such fluid measurement to employ temperature compensation arrangements; nothing that has been heretofore known has been able to provide the highly satisfactory and extremely reliable arrangement that this invention provides, to say nothing of the degree of accuracy that may be obtained with the subject invention. Thus, while it has been suggested that the volume of fluid in a batch measuring system might be directly varied in connection with temperature of the fluid being measured, the arrangements for carrying out such temperature compensation have had various drawbacks and practical difficulties.

Consequently it is an object of this invention to provide a superior total combination including a fluid quantity measuring system wherein the measuring tank includes a reduced cross-section area portion for providing superior accuracy in the quantity measured with each filling of the tank. The entire combination includes superior temperature compensation such that the total results provide a highly accurate yet relatively simple system which is highly reliable.

Briefly, the invention may be described as being applicable to fluid quantity measuring wherein there is employed a fluid quantity measuring system having a predetermined volume measuring tank. The system is such that said tank is filled to an adjustable volume and the adjusted volume depends upon temperature of the fluid being measured. The system includes a reduced cross-section area portion of the tank for causing a relatively large change in fluid level for a relatively small change in the measured volume in order to increase the accuracy of the measurement. In the total system there is included the combination that comprises a float in said reduced portion, and means actuated by said float for determining the measuring volume of said tank. The combination also comprises fluid temperature responsive means for adjusting said last named means whereby the measured volume of fluid is compensated for temperature variations with respect to a predetermined base temperature.

Again briefly, the invention may be described as a system in combination with a temperature compensated fluid quantity measuring system that includes a predetermined volume measuring tank having a reduced cross-section area portion for causing a relatively large change in fluid level for a relatively small change in the measured volume. The system also comprises the combination of a float supported by the surface of said fluid and located in said reduced portion. The combination also comprises a line attached to said float and a reel having said line wound thereon. In addition the combination comprises a switch for controlling arrest of the fluid level and a mechanical linkage between said reel and said switch, including a temperature sensitive element for changing the effective length of said linkage depending upon temperature of said fluid.

The foregoing and other objects and benefits of the invention will be more fully appreciated in connection with an example set forth below in greater detail and that is described in connection with the drawings wherein:

FIGURE 1 is a schematic showing of a complete lease automatic custody transfer system that includes a fluid quantity measuring system in accordance with the invention; and FIGURE 2 is an enlarged transverse cross-section view showing the temperature compensation elements that relate to the float actuated mechanism for determining the cutoff point of fluid level in the measuring tank.

It is to be observed that the invention is particularly adapted for use in connection with a fluid measuring system that employs a volume measuring tank which includes a reduced cross-section area portion. An illustration of such a measuring system may be had in a copending application Serial No. 128,830 filed August 2, 1961. However, such a system may be briefly reviewed in general here, in connection with FIGURE 1 wherein it will be noted that the total system includes a so-called heater-treater tank 11 that receives production fluid from oil wells or the like and acts to remove undesired components such as basic sediment and water. The production fluid is introduced through a pipe 12 that is connected with a pipe 13 which passes through a heat exchange element 14 and then leads into the tank 11 near the upper end thereof. The clean production fluid flows out of the tank 11 through a pipe 17 into the outside or jacket portion of the heat exchanger 14. From there it flows through a short pipe 18 and a valve 19 to a pipe 20 that leads into a surge tank 21 near the top thereof. The surge tank 21 is an upper chamber of an entire fluid quantity measuring unit 25 that has centrally located therein a measuring tank 26 which in turn is comprised of upper and lower flat sloped decks 27 and 28. This structural arrangement for measuring tank 26 has many benefits, some of which appear here but that are more fully described and pointed out in the copending application mentioned above.

At the upper end of the topmost slope deck 27 there is a vertically extending chimney portion 31 that has the lower end thereof opening directly into, so as to form part of the total volume of, the measuring tank 26. Within this chimney portion 31 there is a float 32 located so as to rest upon the upper surface of the fluid being measured, when such fluid level rises into the chimney portion 31. The float 32 has attached thereto a line 35 that preferably takes the form of a flat tape. The tape or line 35 extends vertically upward above the float 32 to a pulley 36 and then travels horizontally to another pulley 37 where it turns downward and extends vertically into a control element 39 that is illustrated in greater detail in FIGURE 2.

Another element of the fluid quantity measuring unit 25 is a third tank 42 that acts as a sump tank and is located underneath the measuring tank 26. As fluid flows through the measuring unit 25, it is first introduced into the surge tank portion 21 via the inlet pipe 20. From there it flows through an outlet pipe 43 that leads to a juncture where fluid may flow as directed, to a fluid sampling unit 44 and to a fluid return pump 45, as well as to the input side of a pneumatically controlled three-way valve 46. The sampler 44 is operated as desired for taking a small sample of the fluid in conjunction with each filling of the measuring tank 26. The fluid return pump 45 is employed to recirculate fluid back into the heater-treater tank 11 via pipe 47 and a valve 50 whenever the fluid becomes contaminated, above a given level, with undesired basic sediment or water.

During the normal measuring operations, fluid that has accumulated in the surge tank 21 is allowed to flow via the valve 46 and a short pipe 51 into the measuring tank 26 near the lower end thereof. Flow takes place by gravity transfer from the fluid in surge tank 21 and causes the fluid level in the sample tank to fall as the fluid fills the measuring tank 26. This arrangement creates a highly accurate system for measuring the volume of fluid in measuring tank 26 since the control of the predetermined volume measurement within tank 26 involves fluid flow action that is controlled by the position of float 32 as the fluid rises within the chimney 31. The accuracy is augmented by the design such that as fluid level in surge tank 21 falls, and fluid level within measuring tank 26 rises, they meet at a common level somewhere in the vicinity of the lower end of the chimney portion 31 of measuring tank 26. Thereafter the level rises slowly and equally in both the surge tank 21 and in the measuring tank 26, depending upon the rate of flow of the incoming fluid that is flowing through pipe 20 to enter the surge tank 21. Such slow rise of fluid level insures a highly accurate cutoff point which is determined by the vertical position of float 32 as determined by the level of fluid in the chimney 31 and transmitted to the control element 39. Furthermore the accuracy is enhanced by the fact that there is a relatively large change in fluid level in the measuring tank 26 (i.e. in chimney portion 31) for a relatively small change in the measured volume.

The measured quantity of fluid after measuring tank 26 has been completely filled is then dumped into the sump tank 42 by the action of three-way valve 46 that is controlled indirectly by actuation of a switch that is directly actuated by the control element 39. This action is such that when the predetermined volume of fluid in measuring tank 26 has been reached, the valve 46 is shifted from the position for passing fluid into the measuring tank 26 from surge tank 21, to the position for draining fluid out from the measuring tank 26 into sump tank 42 while the path from the surge tank is cut off. Thus during the drain portion of each cycle fluid flows out from the measuring tank 26 through pipe 51 and via the three-way valve 46 to a discharge pipe arrangement 54 that directs the fluid into the sump tank 42. Details of the structure for discharge pipe 54 and related elements are not material to this invention and for more complete description thereof reference may be had to the above-mentioned copending application.

It is especially to be observed that in connection with the measuring operation described above there is a temperature compensation that provides for varying the measured volume of each filling of measuring tank 26 in accordance with the temperature of the fluid in the measuring tank as it is filled. This arrangement includes a temperature sensitive unit 57 that in turn includes a temperature bulb 58 located within the measuring tank 26, and necessary related structure such as a capillary tube 60 for carrying the temperature sensing effects from the bulb 58 to a positioning element 59 (see FIG. 2) at the other end of the tube 60. The unit 57 thus acts to cause a translation or linear movement depending upon the temperature of the liquid within the tank 26 as measured by the temperature sensitive bulb 58 of the unit 57. Such a temperature sensing arrangement is well known per se, and a commercial unit that has been found satisfactory is one manufactured by The Partlow Corporation, New Hartford (Utica), New York (and illustrated in the Partlow Bulletin No. 851 at page 1 titled "Mercury Bulb Elements." The details of making use of the temperature dependent movements at the output end (element 59) of temperature sensing unit 57 are illustrated in some detail in FIGURE 2.

Referring to FIGURE 2 it is to be noted that the control element 39 is shown enlarged in vertical cross-section. This element comprises a liquid level indicating unit 62 that is driven by the rotation of a shaft 66 that is controlled by the reel wound end of tape 35. The tape 35 is perforated with centrally located holes 63 that are adapted to fit over peripheral radially extending pins 64 located on the outer surface of a reel or drum 65. The reel 65 is fastened securely to, for positive rotation with the shaft 66 by any convenient means, e.g. a set screw 67 illustrated. On the right hand end of shaft 66 (as viewed in FIG. 2) there is a conventional indicator 71 that provides for visual showing of the liquid level measurement as it has been determined by float 32 in conjunction with the connecting tape 35. Shaft 66 is carried for free rotation by means of at least a pair of antifriction bearings 72 and 73 as illustrated.

In order to provide for the reel 65 to have an automatic winding operation to follow the vertical movements of float 32 such that whenever the float 32 rises reel 65 will rotate and take up slack in the tape 35, there is a helical or clock type spring 76 that has one end thereof securely fastened to the reel 65 by a pin 77 illustrated. The other end of the spring 76 is fastened to housing portion 78 of the control element 39 in any convenient manner (not shown). This spring 76 is arranged for providing a rotational bias in the proper direction to take up slack in the tape 35 whenever the float 32 rises. At the same time the strength of spring 76 is so designed as to allow unreeling (against the bias of the spring) of the reel 65 whenever the float 32 descends or falls in chimney 31. The form of the indicator 71 and its related structural elements is not material to this invention and various commercial structures may be employed.

At the other end of the shaft 66 from indicator 71, there is a so-called drive screw arrangement that is employed for translating rotational movements of the shaft 66 into linear translation axially of the shaft. This drive screw arrangement may take the form illustrated wherein there is a sleeve 81 that has internal threads all the way through. These internal threads mesh with a threaded shaft 82 at the other end of sleeve 81 from that where the shaft 66 enters and to which the sleeve is positively fastened. The positive fastening of sleeve 81 is effected in this case by employing a lock nut 83 that is threaded onto a threaded end portion 84 of the shaft 66. With this arrangement it is merely necessary to hold sleeve 81 while turning the nut 83 in the proper direction to move toward the sleeve 81 so as to set and hold the sleeve and nut in fixed relation relative to the shaft 66.

It will be appreciated that following the locking of sleeve 81 into a desired position on the end of shaft 66, the arrangement will act such that rotation of shaft 66 and consequent accompanying rotation of the sleeve 81 will cause linear movement in an axial direction of the threaded shaft 82 that is threaded into the open end of the sleeve 81. Such action takes place by reason of the fact that shaft 82 is attached by means of a pivot coupling 86 to a lever arm 87 near the upper extremity (as viewed in FIG. 2) thereof. The axis of pivot 86 is arranged horizontally so that shaft 82 cannot rotate about its own axis but can pivot or swing about the horizontal pivot 86.

The lever arm 87 which is connected by the drive screw arrangement described above, to shaft 66 of the control element 39, acts to actuate a microswitch 91 upon contact by the right hand edge (as viewed in FIG. 2) of arm 87 with finger 92 of the microswitch 91. Microswitch 91 is arranged in a control circuit (not shown) for determining the shifting of the valve 46 from fill to drain position and back, in order to control the measuring operation involving the tank 26. The dimensions involved in the parts of control element 39 are designed and adjusted so that the indicated shift of the valve 46 takes place at a predetermined desired fluid level in the chimney 31. It will be appreciated that the predetermined volume of fluid thus measured in the tank 26 is basically determined by calibration of the control element 39 that is controlled by the float 32, and the connected level measuring elements including tape 35 and the reel 65, etc.

Returning to the structure relating to and in conjunction with the lever arm 87, it is pointed out that the arm 87 is vertically supported by means of the pivot 86 on the end of the shaft 82. At the same time, the pivotal position (insofar as horizontal movements of the surface of arm 87 adjacent to finger 92 are concerned) is determined by the position of an adjustable fulcrum for the arm 87. Such fulcrum takes the form of a disc or washer 95 that has rounded edges for contacting a vertical plate 96 which is held in position by a supporting arm 97. Plate 96 is preferably welded to the arm 97 which is in turn bolted in place onto the lower surface or floor of an auxiliary housing 100 that is attached onto one side of the housing 78 of the control element 39. The lever arm 87 is biased for clockwise rotation about its fulcrum 95 by means of a spring 101 in order to avoid any error that would be created by slack in the threads between sleeve 81 and shaft 82 as well as at pivot 86.

It will be observed that the lever arm 87 may take the form illustrated which is a threaded rod or shaft at the lower portion thereof so that the fulcrum 95 may conveniently be made adjustable by having the disc or washer thereof securely attached to one of a pair of nuts 102 and 103 which are designed for meshing with the threads of such lower portion of lever arm 87. In this manner the free one of the nuts 102 or 103 may be loosened relative to the washer 95 and its attached nut, after which the vertical position of the washer 95 may be adjusted by rotating the attached nut to a desired position before locking it again by the locking action of the free one of the nuts 102 or 103.

It is pointed out that the microswitch 91 (which has electrical contacts 106 as required) is physically supported near the free extremity of a bracket 107 which is fastened onto the end of a shaft 108 of the element 59 of temperature unit 57 (FIG. 1). Shaft 108 is moved axially in accordance with the temperature being sensed by the bulb 58 of the temperature unit 57. The bulb 58 is located in measuring tank 26 and is connected to the element 59 (FIG. 2) by the capillary tube 60. The axial movement of shaft 108 moves the bracket 107 (and the microswitch structure 91 supported thereon) horizontally and therefore shifts the location of the finger 92 of switch 91, relative to the surface of arm 87 which will come in contact therewith. This therefore acts to change the fluid level (as determined by float 32) at which microswitch 91 will be actuated, and consequently causes a change in the measured volume of fluid in tank 26 as determined by the temperature of the fluid in the measuring tank.

Details of the control circuit and elements involved in actuation of the pneumatically controlled valve 46 as determined by the actuation of microswitch 91, which are not illustrated here may be found in the above mentioned copending application Serial No. 128,830 which was filed August 2, 1961.

Operation

A review of the operation of the entire system will clarify the pertinent elements in connection with this invention as related to the application of a temperature controlled adjustment of the volume of fluid that is being measured. Thus, referring to both FIGURES 1 and 2 as required, and following through with the steps involved in filling and draining a volume of fluid in the measuring tank 26 the following procedure is carried out.

It will be recalled from the description provided above, that, following a draining of the measuring tank 26, the valve 46 will be shifted so as to close the drain pipe 54 and connect the inlet pipe 51 of tank 26 directly to the supply of fluid in surge tank 21 via the pipe 43. During the previous drain time, the surge tank 21 will have had added to its volume somewhat less than sufficient fluid to completely fill the measuring tank 26. Consequently the fluid which will flow rapidly by gravity transfer from surge tank 21 into measuring tank 26 until the lower portion of the chimney 31 has been reached, will have its level fall until equalized with the level of fluid within measuring tank 26. Thereafter the fluid levels will rise together, both in chimney 31 and in the surge tank 21, at a reduced rate and will carry the float 32 upward therewith. During this rising movement of float 32 the reel 65 (FIG. 2) will be rotated so as to take up the slack in the tape or line 35 in the manner previously described. Such action will rotate shaft 66 (and sleeve 81 likewise) so that shaft 82 will be drawn axially to the right (as viewed in FIG. 2) and will thus pivot the lever arm 87 about its fulcrum 95, where it rests in contact with the plate 96, and will thus cause the arm 87 to approach and contact the control finger 92 of the microswitch 91 for actuation thereof.

When the microswitch 91 is actuated by contact of the finger 92 with the lever arm 87, it acts through the above indicated control circuit (not shown) to cause valve 46 to switch over to its drain position for the measuring tank 26 and simultaneously to close the path for fluid to flow from the surge tank 21 into the measuring tank 26. This is the end of the fill portion of a cycle of measuring of a volume of fluid in measuring tank 26, and the beginning of the drain portion of such a cycle. The absolute volume of fluid thus measured varies with and depends upon the temperature of the fluid in the measuring tank each time, in the manner described above.

The various elements so far described will be adjusted so that at a given temperature the microswitch 91 will be actuated when the fluid level in chimney 31 has reached a point such that some predetermined definite volume of fluid is contained in measuring tank 26. Then when the microswitch 91 is actuated, it will control the actuation of three-way valve 46 to shift over and drain off the measured fluid quantity from tank 26 into the sump tank 42. By proper calibration of the system, the fluid volumes thus measured may have a predetermined size for a given temperature. Then by reason of the temperature sensitive elements described above, whenever the temperature of the fluid in tank 26 varies from such given level the physical position of microswitch 91 will be shifted. Consequently the level of fluid in chimney 31 at which microswitch 91 will be actuated, will be changed to increase or decrease the quantity of fluid as determined by the temperature as it varies from the predetermined norm. This is done with proper calibration so as to maintain a constant volume of fluid being measured, when corrected or related to a given constant temperature. By this arrangement the need for applying temperature correction calculations with respect to the measured volume of fluid, is eliminated since the volume of fluid itself is changed dependent upon temperature so as to maintain a constant volume at a given temperature level.

While a particular embodiment of the invention has been described in considerable detail in accordance with the applicable statutes, this is not to be taken as in any way limiting the invention but merely as being descriptive thereof.

We claim:

1. In a fluid quantity measuring system having a predetermined volume measuring tank, wherein said tank is filled to an adjustable volume, and wherein the adjusted volume depends upon temperature of the fluid being measured, said system including a reduced cross-section area chimney portion of said tank for causing a relatively large change in fluid level for a relatively small change in the measured volume in order to increase the accuracy of the measurement, the combination comprising a float in said chimney portion, means actuated by said float for determining the measuring volume of said tank, and means for adjusting said last named means responsive to the temperature of said fluid whereby the measured volume of fluid is compensated for temperature variations with respect to a predetermined base temperature.

2. The invention according to claim 1 wherein said float actuated determining means comprises valve means for controlling filling of said tank, switch means for controlling said valve means, and control means for actuating said switch means, said control means including antifriction means connecting said float to said control means, said temperature responsive means providing an adjustment of said switch means relative to said control means.

3. The invention according to claim 2 wherein said antifriction means comprises a line attached to said float, and a reel for said line, and wherein said control means comprises a mechanical linkage associated with said reel for actuating said switch means.

4. The invention according to claim 3 wherein said mechanical linkage comprises a lever arm pivoted for controllably actuating said switch means, and wherein said temperature responsive means adjusts the relative position of said lever arm and said switch means whereby the location of said float when said switch is actuated is adjusted in accordance with the temperature of said fluid.

5. The invention according to claim 4 wherein said lever arm has an adjustable length.

6. In combination with a temperature compensated fluid quantity measuring system including a predetermined volume measuring tank having a reduced cross-section area chimney portion for causing a relatively large change in fluid level for a relatively small change in the measured volume, the combination comprising:

(*a*) a float supported by the surface of said fluid and located in said chimney portion
(*b*) a line attached to said float
(*c*) a reel having said line wound thereon
(*d*) a switch for controlling arrest of the fluid level
(*e*) a lever arm for actuating said switch
(*f*) a mechanical linkage between said reel and said lever arm
(*g*) and a temperature sensitive element for changing the relative position of said switch and said lever arm depending upon the temperature of said fluid.

References Cited in the file of this patent

UNITED STATES PATENTS

| | | |
|---|---|---|
| 1,607,464 | Kirby | Nov. 16, 1926 |
| 2,551,793 | DeGiers et al. | May 8, 1951 |
| 3,019,649 | Kuntz et al. | Feb. 6, 1962 |
| 3,094,871 | Smith | June 25, 1963 |

UNITED STATES PATENT OFFICE
CERTIFICATE OF CORRECTION

Patent No. 3,152,478                October 13, 1964

Leonard H. Hughes et al.

It is hereby certified that error appears in the above numbered patent requiring correction and that the said Letters Patent should read as corrected below.

Column 7, lines 6 and 7, strike out "responsive to the temperature of said fluid" and insert the same after "means" in line 5, same column 7.

Signed and sealed this 6th day of April 1965.

(SEAL)
Attest:

ERNEST W. SWIDER                EDWARD J. BRENNER
Attesting Officer                Commissioner of Patents